(12) United States Patent
Peng

(10) Patent No.: US 7,283,490 B2
(45) Date of Patent: Oct. 16, 2007

(54) METHOD FOR AUTOMATICALLY ESTABLISHING BASE STATION OPERATING AND MAINTAINING CHANNEL IN INTERNATIONAL MOBILE TELECOMMUNICATIONS 2000

(75) Inventor: Jianhua Peng, Shenzhen (CN)

(73) Assignee: Hauwei Technologies Co., Ltd., Shenzen, Guandong Province (CN)

( * ) Notice: Subject to any disclaimer, the term of this patent is extended or adjusted under 35 U.S.C. 154(b) by 1120 days.

(21) Appl. No.: 10/391,684

(22) Filed: Mar. 19, 2003

(65) Prior Publication Data
US 2003/0219010 A1 Nov. 27, 2003

(30) Foreign Application Priority Data
May 22, 2002 (CN) .................................. 02 1 17831

(51) Int. Cl.
*H04B 7/00* (2006.01)
(52) U.S. Cl. ............... 370/310.1; 370/329; 370/401
(58) Field of Classification Search ............ 370/278, 370/328, 329, 338, 352–356, 400, 401, 310.1, 370/310.2, 395.1, 395.2
See application file for complete search history.

(56) References Cited

U.S. PATENT DOCUMENTS 6,185,409 B1 * 2/2001 Threadgill et al. ......... 455/12.1

* cited by examiner

*Primary Examiner*—John Pezzlo
(74) *Attorney, Agent, or Firm*—Edwards Angell Palmer & Dodge LLP (57) ABSTRACT

A method automatically establishes a base station operating and maintaining channel in International Mobile Telecommunications 2000. A BS initiates a BOOTP Request to the base station controller (BSC) or RNC through the IPOA channel between the BS and the BSC/RNC, and then the BS obtains the IP address allocated to it from the reply from the BSC/RNC, so that an operating and maintaining channel is established between the BS and the BSC/RNC. A BS can establish a maintaining channel for itself automatically when starting, avoiding IP address confliction and parallel starting problems. Moreover, establishing a maintaining channel for the BS results in an easy and small workload. Thus programs and data can be loaded automatically to the BS, and the BS can be effectively configured and maintained by a remote device (i.e., the operating and maintaining station of the BS) at a low cost, and good quality is realized. The method is suitable for star networking, recurrent networking, tree networking, ring networking, etc.

12 Claims, 5 Drawing Sheets

Fig.1

| op (1) | Htype (1) | hlen (1) | hops (1) |
|---|---|---|---|
| xid (4) | | | |
| secs (2) | | flags(2) | |
| ciaddr (4) | | | |
| yiaddr (4) | | | |
| siaddr (4) | | | |
| giaddr (4) | | | |
| chaddr (16) | | | |
| sname (64) | | | |
| file (128) | | | |
| vend(64) | | | |

Fig.5 subnet number: filled by client

Fig.6

| field | length | description |
|---|---|---|
| subnet Number | 1 byte | 128 ~ 255, filled by the BS |
| other bytes | 15 byte | Not used, '0' |

METHOD FOR AUTOMATICALLY ESTABLISHING BASE STATION OPERATING AND MAINTAINING CHANNEL IN INTERNATIONAL MOBILE TELECOMMUNICATIONS 2000

BACKGROUND OF THE INVENTION

1. Related Application Data

Priority is hereby claimed under 35 U.S.C. §119 to Chinese application No. 02117831.3, filed May 22, 2002, the entire content of which is hereby expressly incorporated herein by reference.

2. Field of the Invention

The present invention relates to a method for establishing, operating, and maintaining channels at the interfaces between Base Station Controllers (BSC) and base stations in WCDMA, CDMA2000, and TD-SCDMA in International Mobile Telecommunications 2000 (3G).

3. Background of the Invention

With the development of wireless communication technologies, communication networks are growing more and more complex and giant, which demands more on the maintainability of the networks. However, the protocols for 3G (e.g., WCDMA, CDMA2000, and TD-SCDMA systems) only prescribes to establish IP-over-ATM (IPOA) channels between base stations (BTS or NodeB) and the base station controllers (BSC/RNC) and doesn't specify the method to establish maintaining channels for base stations. Thus automatic remote launching of base stations is not an inherent capability, and it results in inconvenient network maintenance. Currently, there are typically 2 methods to establish a maintaining channel for a base station. In method 1, servicing staff configure relevant data at BS side and BSC side to configure a special operating and maintaining channel, thus the problem of the base station initiation and operation is solved. This method is very inconvenient and may result in errors. In method 2, when all base stations start for the first time, they send a request to the operating and maintaining station of the BS through the default Permanent Virtual Connections (PVC) and Internet Protocol (IP) addresses preset at the factory to obtain formal configuration data. At the next startup, the base stations can use the formal PVCs and IP addresses to contact the operating and maintaining station of the BS and delete original channels and IP information. In this method, all base stations can not start simultaneously and the network maintenance and management is very complex during the startup of the base stations due to fixed communication ports or IP addresses used for all base stations.

Seen from above, the major problem of conventional methods for establishing base station maintaining channels is the lack of an automatic mechanism for establishing maintaining channels. Therefore, establishing maintaining channels with the conventional methods requires complex operations and high workload, and may result in errors, causing high maintenance cost but poor maintenance quality.

SUMMARY OF THE INVENTION

One object of the present invention is to provide a method for automatically establishing base station operating and maintaining channel in International Mobile Telecommunications 2000, i.e., a method for automatically establishing maintaining channels IPOA between base stations and base station controllers. With this method, a BS can automatically establish an IPOA channel to the BSC to connect to the operating and maintaining system of the BS, in order to improve network launching speed and maintainability, reduce operating and maintaining cost, and enhance operating and maintaining quality.

To attain this objective, a method may be provided for automatically establishing base station operating and maintaining channel in International Mobile Telecommunications 2000. A default PVC is established between a base station and BSC/RNC. The base station broadcasts a Bootstrap Protocol (BOOTP) Request to the BSC/RNC through the established PVC. The BSC/RNC sends a BOOTP Reply to the base station, and the BOOTP Reply containing the IP address allocated to the BS by the BSC/RNC. The BS obtains the IP address from the BOOTP Reply and establishes an IPOA channel according to the IP address and the default PVC; thus an operating and maintaining channel is established between the BS and the BSC/RNC.

The PVC is established according to the default configuration of the BS.

The communication between the BS and the remote maintaining station is maintained through the route to the BSC/RNC.

The BOOTP Request may comprise:

op: indicates the type of BOOTP packet;

htype: indicates the type of hardware address;

hlen: indicates the length of hardware address;

hops: indicates the number of gateways passed;

xid: indicates the matching between the BOOTP Request and the BOOTP Reply secs: indicates the seconds elapsed since the client boots;

ciaddr: indicates the IP address of the client;

yiaddr: indicates the IP address of the client filled by the server;

siaddr: indicates the IP address of the server filled by the server;

giaddr: indicates the address of the gateway passed;

chaddr: indicates the hardware address of the client;

sname: indicates the name of the optional host;

file: indicates the file name to be loaded;

vend: indicates the field defined by factory.

The route between the BSC/RNC and the operating and maintaining station may be configured, so that the maintaining channel established between the BS and the BSC/RNC is connected to the maintaining channel in the remote maintaining station. As a result, the maintenance communication between the BS and the operating and maintaining station is established.

If the operating and maintaining station is external to the BSC/RNC and the IP address of the BS is allocated by the operating and maintaining station, the PVC information of the BS should be added to the 'chaddr' in the BOOTP packet to ensure that the external operating and maintaining station can identify the BS that is sending the BOOTP Request packet.

If the functional module of the host of the BSC/RNC allocates the IP address for the BS, the PVC information of the BS is added to the 'chaddr' in the BOOTP packet to ensure that the functional module of the host can identify the BS sending the BOOTP Request packet.

The operating and maintaining station or the functional module allocate the IP address for the BS according to the mapping relationship between the PVC channel and the IP address of the IP device at the opposite side of the IPOA channel.

ATM APS is used to implement Automatic Protection Switch for the IPOA maintaining channel and ring networking.

With the method for automatically establishing an operating and maintaining channel between the BS and BSC, the BS can automatically establish an IPOA channel to the BSC to connect to the operating and maintaining system of the BS; this improves network launching speed and maintainability, reduces operating and maintaining costs, and enhances operating and maintaining quality.

DETAILED DESCRIPTION OF THE EMBODIMENT

The present invention is described in further detail according to the drawings.

Figure 1:
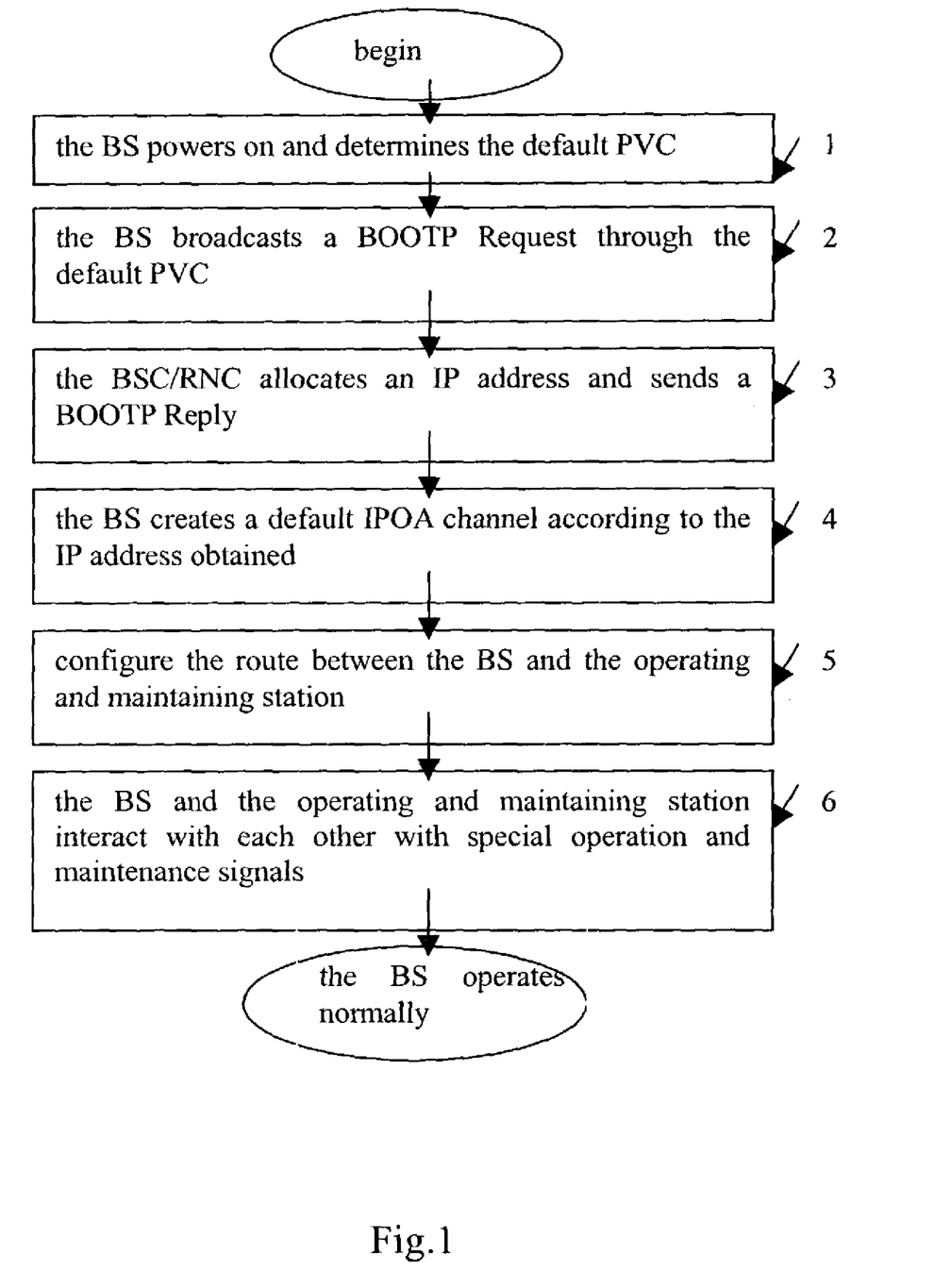
FIG. 1 is the flowchart of an embodiment of the present invention.

FIG. 1 is the flowchart of an embodiment according to the present invention. The method in FIG. 1 is mainly based on the following premises: 1. ATM transmission between the BS and the BSC/RNC; 2. a physical connection established between the BS and the BSC/RNC.

Figure 2:
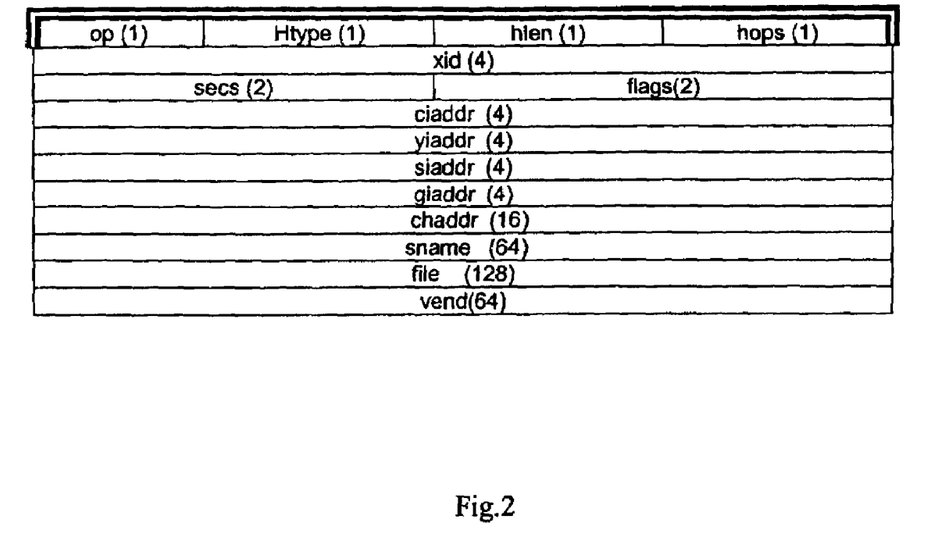
FIG. 2 shows the format of the BOOTP packet used in present invention.
Figure 6:
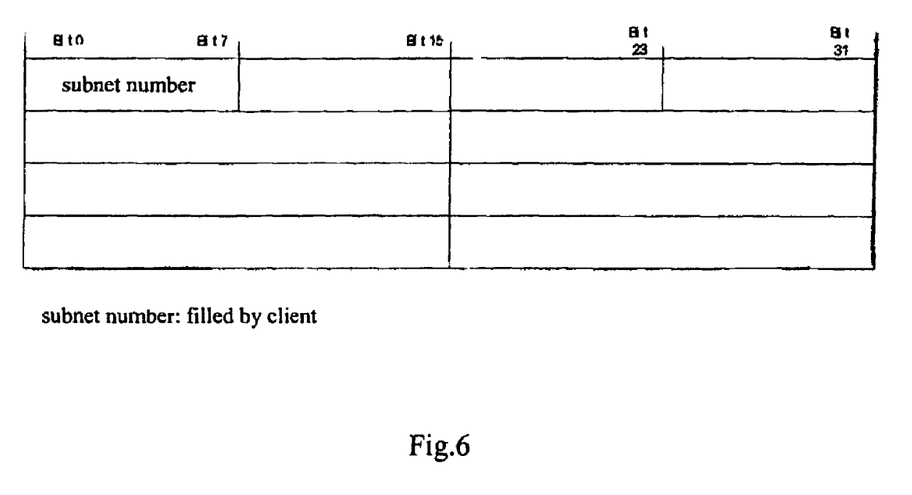
FIG. 6 shows the format of the physical address of the client in the embodiment in FIG. 5.
Figure 7:
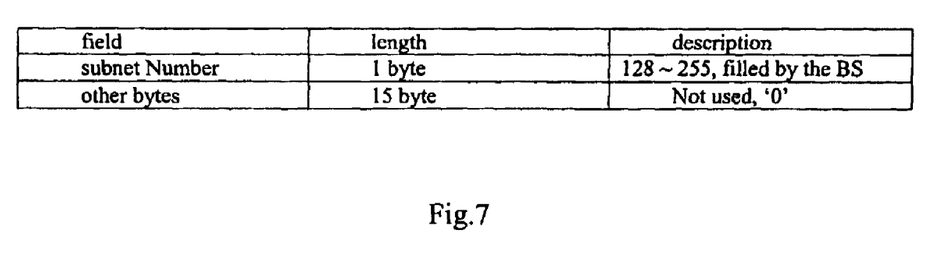
FIG. 7 shows the format of the physical address of the client in FIG. 6.

In act (1), the BS powers on and determines the default PVC for the operating and maintaining channel. In act (2), the BS broadcasts a BOOTP Request to the BSC/RNC according to said default PVC. In act (3), the BSC/RNC allocates an IP address to the BS and fills it in the BOOTP Reply packet, and then sends the BOOTP Reply packet to the BS. In act (4), the BS obtains the IP address allocated to it and establishes an IPOA channel according to the IP address obtained and the default PVC. Thus an IPOA channel is established between the BS and the BSC/NRC. If the route from the BS to the remote maintaining station through the BSC/NRC is not configured in advance, then in act (5), the route is configured. In act (6), the operating and maintaining station and the BS interact with each other through special operating and maintaining messages to load programs or data to the BS, and then the BS is launched. The BOOTP Request message in act (2) comprises (for the detailed format of BOOTP, refer to FIG. 2):

op: indicates the type of BOOTP packet;
htype: indicates the type of hardware address;
hlen: indicates the length of hardware address;
hops: indicates the number of gateways passed;
xid: indicates the matching between the BOOTP Request and the BOOTP Reply;
flags: indicates whether to broadcast the BOOTP Request, the BS must use broadcast mode to send the BOOTP Request;
sees: indicates the seconds elapsed since the client boots;
ciaddr: indicates the IP address of the client;
yiaddr: indicates the IP address of the client filled by the server;
siaddr: indicates the IP address of the server filled by the server;
giaddr: indicates the address of the gateway passed;
chaddr: indicates the hardware address of the client; if the BS doesn't 'know' its own hardware address, this field should be treated specially to enable the BSC/RNC to identify the BS sending the BOOTP Request. The detailed format of this field is shown in FIG. 6 and FIG. 7;
sname: indicates the name of the optional host;
file: indicates the file name to be loaded;
vend: indicates the field defined by factory. In this embodiment, the BSC/RNC may use this field to perform some special process to facilitate the establishment of the route.

During implementation of the present invention, a physical connection between the BS and the BSC/RNC is established, such as a UNI-based connection or ATM IMA-based connection. Despite UNI or IMA, the BS can identify the type by listening to cells on the link to obtain the data of the physical link, wherein the data is configured by the BSC/RNC. For example, for IMA mode, the BS can obtain the information of the IMA link configured actually by listening to the ICP cell of the IMA frame. It is assumed that the physical link configured for the special operating and maintaining channel in the BS configuration data is the one with the relatively smallest physical link number viewed from the BS side or corresponding to the relatively smallest physical link number at the BS side, thus a default PVC is established. For example, the default PVC can be appointed as VPI=1/VIC=31. After the default PVC is determined, the BS can initiate a BOOTP Request to apply for an IP address. For the BSC (or RNC), the IP address can be allocated by the BSC host or the operating and maintaining station.

(1) If the IP address is allocated by the operating and maintaining station of BSC, when the BSC host or RNC host detects a BOOTP Request from the BS, it should send the BOOTP Request to the operating and maintaining station of the BSC/RNC, and enable the operating and maintaining station to identify the BS sending the BOOTP Request and thus allocating an IP address to the BS. If the operating and maintaining station is external to the BSC/RNC host (i.e., an IP network lies between the BSC/RNC and the operating and maintaining station), the operating and maintaining station of BSC/RNC will identify the BS sending the BOOTP Request according to the received 'chaddr' field in the BOOTP packet and allocate an IP address to the BS. Because the 'chaddr' field in the BOOTP packets sent to the BSC and the RNC are identical, the BSC/RNC should perform some process to the BOOTP Request packet, i.e., the 'chaddr' in the BOOTP packet should be modified to identify different BSs (for example, the information of the PVC connected to the BS is inserted in the 'chaddr' field), which will enable the operating and maintaining station of BSC/RNC to identify the BS sending the BOOTP Request. Moreover, the system should also ensure that the BOOTP Reply from the operating and maintaining station of the BSC/RNC can be resent to the BS, thus the BS can obtains the IP address allocated to it by the operating and maintaining station of BSC/RNC. In actual embodiments, the BS may also obtain the name of the program to be loaded and the path of the program when necessary.

(2) If the IP address of the BS is allocated by the host functional module in the BSC/RNC, the underlying functional module should modify the 'chaddr' field in the BOOTP packet (e.g., insert the information of the PVC connected to the BS in it) to identify different BSs. The functional module allocating the IP address to the BS may check out the IP address of the device at the opposite side of the IPOA channel according to the relationship between the PVCs used in the configuration information preset for the IPOA channel in the BSC/RNC and the 'chaddr' field of the BOOTP packet, and then allocate an IP address to the BS, which will create an IPOA channel according to the IP address allocated. When the IPOA channel between the BS and the BSC/RNC is established, programs and data can be loaded onto the BS through the channel.

After the IPOA channel between the BS and the BSC/RNC is established according to this method, the operator may configure relevant route data at the BSC/RNC to open the IP channel from the BS to the operating and maintaining station. But now, the BS hasn't established direct information communication with the operating and maintaining station, and the BS doesn't 'know' the IP address of the corresponding operating and maintaining station. The method for the BS to obtain the IP address of the corresponding operating and maintaining station as well as how it initiates the Request for loading programs or data may be determined by BS manufacturers according to the practice. For example, the following methods may be used:

Method 1: The operating and maintaining station sends handshake messages to the BS continuously (the operating and maintaining station has been configured with the BS's IP address, for example, it may 'PING' the BS periodically). When the IP channel between the BS and the operating and maintaining station is established, the BS receives the handshake messages from the operating and maintaining station, and obtains the IP address of the operating and maintaining station and establishes the direct communication channel to the operating and maintaining station. Then, the BS sends a Request to load programs. After obtaining the programs, the BS will send a Request to load data. After obtaining the data, the BS will start to work.

Method 2: When the IP channel between the BS and the operating and maintaining station is launched, the operator can initiate program and data loading tasks at the operating and maintaining station side to load the programs and data necessary for the normal operation of the BS onto the BS.

Figure 3:
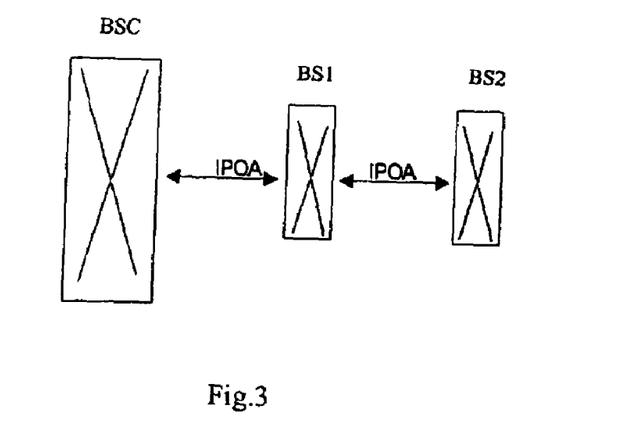
FIG. 3 is the diagram of establishing an IPOA channel in a recurrent network according to the method of the present invention.
Figure 4:
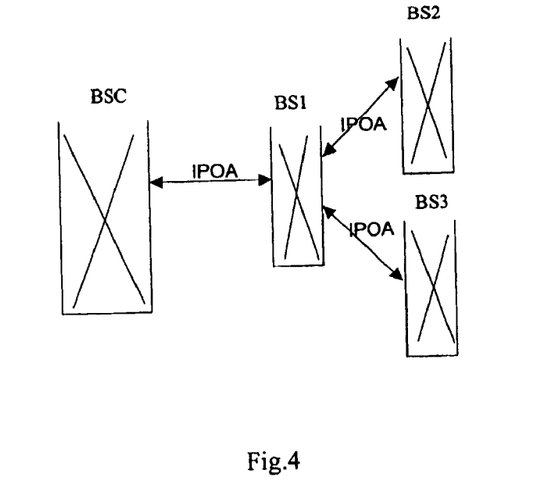
FIG. 4 is the diagram of establishing an IPOA channel in a tree network according to the method of the present invention.

FIG. 3 and FIG. 4 are diagrams of establishing an IPOA channel in a recurrent network and a tree network respectively. In a recurrent network, the BSs start to work hierarchically from top to bottom. Only when the superior BSs operate normally can the subordinate BSs start to work. However, if the superior BSs support bypass mode, subordinate BSs must not perform PVC switch with the superior BSs, thus all BSs may start to work simultaneously. In the following description, it is not specified whether the bypass mode is supported. For BSCs or RNCs, the BSs may start to work in parallel in a star network. In the figure, the BSs directly connected to the BSCs or RNCs may start to work in this method, thus the program and configuration data obtained by the BS can operate normally. In such an environment, the data obtained by the BS contains the PVC information of the segment (used to configure the operating and maintaining channel for the subordinate BSs) between the BS and the BSC/RNC and the configuration information of the cross connections (if required) between the PVC and the default PVCs of subordinate BSs. Other BSs connected to the BS will also broadcast BOOTP Requests through the default PVC according to this method. The configuration data of the BS that starts to work first contains the configuration information of the PVC cross connections. An IPOA channel will be established between the BS and the BSC/RNC according to the configuration data. Hence the BS only performs PVC switching on corresponding ports. Logically, a BS is cascaded to the BSC/RNC through a plurality of BSs, i.e., through ATM transmitting devices. Viewed from a subordinate BS, the superior BSs between the BS and the BSC/RNC are similar to ATM switching devices. When a subordinate BS receives the BOOTP Reply and obtains the IP address, an IPOA channel is established between the subordinate BS and a superior BS, thus the subordinate BS is connected to the operating and maintaining station because that superior BS has already been connected to the operating and maintaining station. In this way, all BSs can start to work automatically. However, only when the superior BSs operate normally can the subordinate channels be established.

Figure 5:
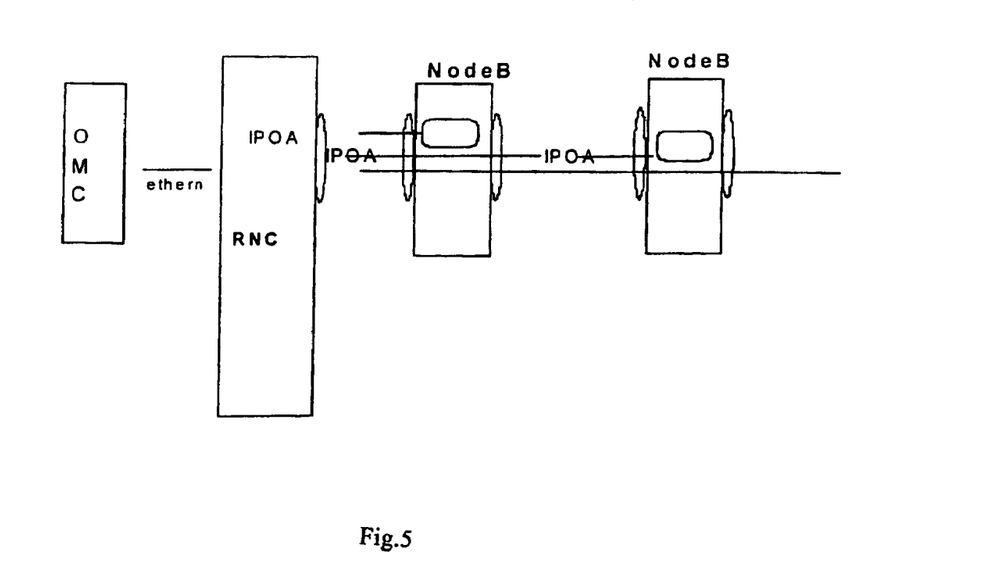
FIG. 5 is the structural diagram of an embodiment of a UTRAN recurrent network in WCDMA according to the method of the present invention.

FIG. 5 is the structural diagram of a recurrent UTRAN network composed of WCDMA system according to the present invention. As shown in FIG. 5, the BSs of the UTRAN are organized in a recurrent network, and the BSCs or RNCs are connected to the operating and maintaining station through IP connections. The BSs are connected to the RNCs through IAM E1 connections.

First, NodeB1 listens to the ICP cells of IMA frames on the E1 link to obtain IMA configuration information. The default PVC is in the IMA containing minimum link number, and the default PVC (VPI=1, VCI=31) already exists between NodeB1 and the RNC. Then NodeB1 broadcasts a BOOTP Request. The parameters of the BOOTP packet are:

op=1; htyp=1; hlen=6; hops=0; xid=a random value (ensure that parameters between individual BS are different through an algorithm or use local time directly); sees=0; flags (B)=1; ciaddr=0; yiaddr=0; siaddr=0; giaddr=0; chaddr=(in order to enable BSC/RNC to process conveniently, format of this field is shown in FIG. 6 and FIG. 7); sname=NULL; file=NULL; vend=0.

When the BOOTP server or the BOOTP agent of the BSC/RNC detects the BOOTP Request, it will process the BOOTP Request packet as follows:

(1) If the IP address of the BS is allocated by the operating and maintaining station of NRC, the BOOTP agent or BOOTP server will add relevant information which the external operating and maintaining station of BSC/RNC can identify the NodeB1 sending the BOOTP Request to the 'chaddr' field, for example, the information of the PVC can be added to this field. If the 'giaddr' field is modified at different gateways, gateway information should be added. At the same time, 'hops' should add 1, and 'sees' should be modified. Then the RNC host forwards the modified BOOTP packet to the operating and maintaining station. After receiving the BOOTP Request, the external operating and maintaining station allocates an IP address according to the 'chaddr' field, adds the IP address information to the BOOTP Reply packet, and sends the BOOTP Reply packet. When the RNC host receives the BOOTP Reply packet, it forwards the BOOTP Reply to the default PVC of the Iub (interface between the RNC and the BS). Thus, NodeB1 can receive the BOOTP Reply message and obtain the IP address.

(2) If the IP address of the BS is allocated by the BOOTP server of the RNC host, the AAL of the RNC host adds the PVC information in the 'chaddr' field of the BOOTP Request packet when forwarding the message to the superior layer. After receiving the BOOTP Request packet, the BOOTP server retrieves the PVC information and obtains the IP address of the device opposite to the Iub interface according to the preset configuration related to the IPOA channel on the host. The IP address is exactly the IP address of the BS. Then, the BOOTP server sends the BOOTP Reply carrying the IP address allocated to the BS. The BS receives the BOOTP Reply, obtains the IP address, recreates an IPOA device, and attaches the default PVC to the IPOA device. Thus an IPOA channel is established between NodeB1 and RNC. Then, the RNC re-configures or pre-configures the route to the operating and maintaining station of BS, thus the maintaining channel between NodeB1 and the operating and maintaining station is established. Certainly, if the files to be loaded are on the operating and maintaining station of RNC, the BOOTP Reply may also include files names and file path to indicate the BS to load the files.

NodeB1 has established the IPOA channel between itself and the RNC. It then configures route data to the operating and maintaining station of BS, thus maintenance communication between the operating and maintaining stations of NodeB1 and that of NodeB1 can be realized. NodeB1 is loaded with program and data, and operates normally. Then, it establishes connections (service connection, subscriber connection, and management connection) to the RNC according to the configuration data. Then the PVC (for IPOA channel of NodeB2) between NodeB1 and the RNC is configured, suppose it is VPI=1 and VCI=33. At the same time, the data for the cross connection between the PVC and the default PVC of NodeB2 is configured for NodeB1. In this way, the maintenance segment of NodeB2 between NodeB1 and RNC is established.

NodeB2 powers on and initiates a BOOTP Request through the default PVC (VPI=1; VCI=31). Node1 receives the BOOTP Request at the corresponding port through the default PVC and performs ATM switch according to the preconfigured PVC cross connection. Then the BOOTP Request is switched to the PVC (VPI=1; VCI=33). Then, RNC processes the BOOTP Request in the same way, e.g., forwards it to the external operating and maintaining station to allocate IP address or the name and path of the program. The operating and maintaining station sends a BOOTP Reply, and the RNC host forwards the BOOTP Reply. Through PVC switching at NodeB1, NodeB2 receives the Reply, and the IPOA connection between NodeB2 and RNC is established. Alternately, the RNC host functional module allocates the IP address and sends the BOOTP Reply, thus NodeB2 obtains IP address and establishes the IPOA channel. Finally, the route data between RNC and the operating and maintaining station is configured, or it is configured in advance. Then the maintaining channel between NodeB2 and the operating and maintaining station is established.

It should be noted that the default PVC is only the segment directly connected to the BS. If ATM switching is necessary, data for the corresponding ATM cross connection should be configured. The next PVC segment can be configured with a random serial number. Such a scheme is highly flexible and affects conventional ATM network little.

Figure 8:
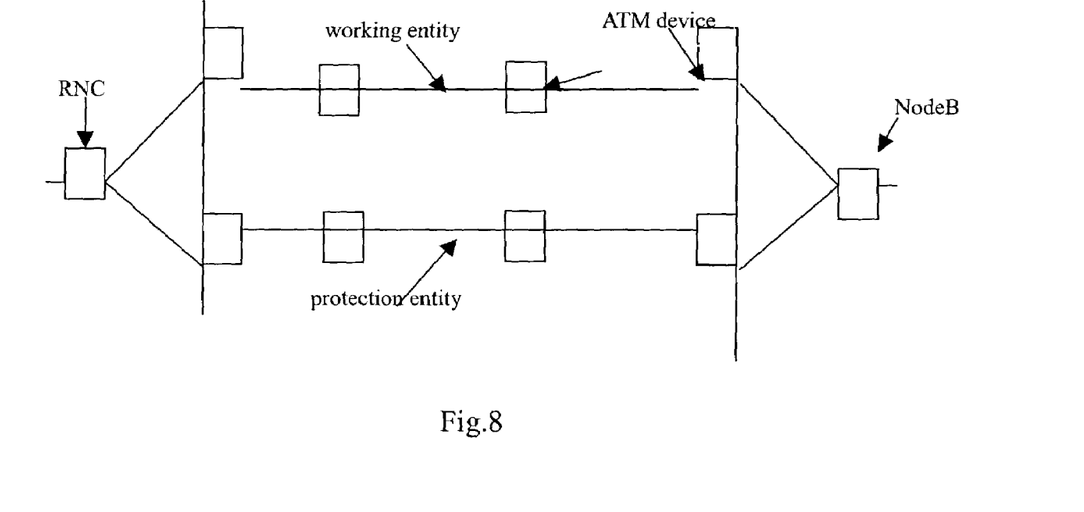
FIG. 8 shows a 1:1 or 1+1 VP/VC path protection scheme.

In actual embodiments, ATM APS function may be used to enhance network reliability and stability, i.e., a protective ATM link is deployed between each BS and its BSC/RNC. The protective ATM link and the ATM link for the default maintaining channel of the BS supplement each other, where one is a working link, and the other is a protecting link. When the BS or BSC detects SF or SD events at the working ATM link (or linkset), it may switch to the protective ATM link (or linkset). The ATM APS function in the present invention complies with ITU I.630. ATM OAM is shown in ITU I.610. FIG. 8 is the 1:1 or 1+1 VP/VC path protection scheme.

If the protective ATM link is configured across different ATM devices, a ring network may be implemented through different paths, as shown in FIG. 8. If the original working ATM link is recovered (e.g., default PVC) after the automatic switch happens, then a recovering switch happens, and the workload is switched to the special original operating and maintaining channel. The automatic switch at the ATM layer doesn't affect its superior layer (e.g., IP layer).

The operating and maintaining channel established according to the method of the present invention helps to simplify network maintenance. However, it is based on the following regulations:

(1) ATM-based IUB interfaces, and Bootp protocol for the establishment of the maintaining channels, where the protocol stack is shown in the following table;

| Bootp |
|-------|
| UDP |
| IP |
| ATM |

(2) B part of flag2 (2) in bootp Request packet=1;

(3) subnet number of 'chaddr' (16) in bootp Request packet >=128, other bytes are '0', referring to FIG. 6 and FIG. 7;

(4) IP address allocated to the BS is written in 'yiaddr (4)' field in the bootp Reply packet by the BSC or the operating and maintaining station;

(5) define default PVC: VPI=1, VCI=31;

(6) the BS initiates the BOOTP Request through the default PVC to obtain IP address;

(7) the physical link configured for the special operating and maintaining channel in the BS configuration data is the one with the relatively smallest physical link number viewed from the BS side or corresponding to the relatively smallest physical link number at the BS side;

(8) ATM APS function is supported and ATM APS complys with ITU I.630.

Figure 9:
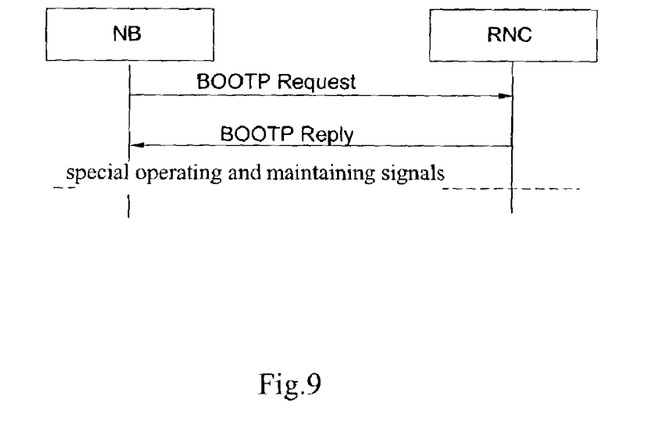
FIG. 9 is the reference flowchart of automatically establishing a special maintaining channel.

FIG. 9 shows the process of automatically establishing a special maintaining channel in normal cases:

The formats of BOOTP Request and BOOTP Reply are described above.

In abnormal cases, if the BS doesn't receive the BOOTP Reply after $T_{timeout}$, it waits for $T_{delay}$, and then reinitiates a BOOTP Request; if the BOOTP Request message is resent for more than $N_{max}$ times, the process will be ceased. Units and values of $T_{timeout}$, $T_{delay}$, and $N_{max}$ can be configured by manufacturers.

During normal operation, if the communication link breaks off and the BS loses its IP address, or the BSC/RNC is inaccessible for a relatively long time, the BS may initiates a process to establish a special operating and maintaining channel automatically to obtain IP address again.

The method of present invention is suitable for various networking patterns, including star networking, tree networking, recurrent networking, and ring networking.

What is claimed is:

1. A method for automatically establishing base station operating and maintaining channels in International Mobile Telecommunications 2000, the method comprising:
   establishing a default PVC between a base station and BSC/RNC;
   the base station broadcasting a Bootstrap Protocol (BOOTP) Request to the BSC/RNC through the established default PVC;
   the BSC/RNC sending a BOOTP Reply to a base station BS, the BOOTP Reply comprising an IP address allocated to the BS by the BSC/RNC;
   the BS obtaining the IP address from the BOOTP Reply and establishing an IPOA (IP OVER ATM) channel according to the IP address and the default PVC; so that an operating and maintaining channel is established between the BS and the BSC/RNC.

2. A method for automatically establishing base station operating and maintaining channel of claim 1, wherein the default PVC is established according to the default configuration of the BS.

3. A method for automatically establishing base station operating and maintaining channel of claim 2, further comprising maintaining communication between the BS and the remote maintaining station through the route from the BS to the BSC/RNC.

4. A method for automatically establishing base station operating and maintaining channel of claim 3, wherein the act of the base station broadcasting BOOTP Request is initiated from the BS, the initiating from the BS comprising:
   op: indicating a type of BOOTP packet;
   htype: indicating a type of hardware address;
   hlen: indicating a length of hardware address;
   hops: indicating a number of gateways passed;
   xid: indicating a matching between the BOOTP Request and the BOOTP Reply
   secs: indicating a seconds elapsed since the client boots;
   ciaddr: indicating an IP address of the client;
   yiaddr: indicating an IP address of the client filled by the server;
   siaddr: indicating an IP address of the server filled by the server;
   giaddr: indicating an address of the gateway passed;
   chaddr: indicating a hardware address of the client;
   sname: indicating a name of the optional host;
   file: indicating a file name to be loaded; and
   vend: indicating a field defined by factory.

5. A method for automatically establishing base station operating and maintaining channel of claim 1, the method further comprising: the route between the BSC/RNC and the operating and maintaining station being configured, so that the maintaining channel established between the BS and the BSC/RNC is connected to the maintaining channel and to the remote maintaining station, the maintenance communication between the BS and the operating and maintaining station thereby being established.

6. A method for automatically establishing base station operating and maintaining channel of claim 2, the method further comprising: the route between the BSC/RNC and the operating and maintaining station being configured, so that the maintaining channel established between the BS and the BSC/RNC is connected to the maintaining channel and to the remote maintaining station, the maintenance communication between the BS and the operating and maintaining station thereby being established.

7. A method for automatically establishing base station operating and maintaining channel of claim 3, the method further comprising: the route between the BSC/RNC and the operating and maintaining station being configured, so that the maintaining channel established between the BS and the BSC/RNC is connected to the maintaining channel and to the remote maintaining station, the maintenance communication between the BS and the operating and maintaining station thereby being established.

8. A method for automatically establishing base station operating and maintaining channel of claim 4, the method further comprising: the route between the BSC/RNC and the operating and maintaining station being configured, so that the maintaining channel established between the BS and the BSC/RNC is connected to the maintaining channel and to the remote maintaining station, the maintenance communication between the BS and the operating and maintaining station thereby being established.

9. A method for automatically establishing base station operating and maintaining channel of claim 5, the method further comprising: if the operating and maintaining station is external to the BSC/RNC, and the IP address of the BS is allocated by the operating and maintaining station, the PVC information of the BS being added to the 'chaddr' in the BOOTP packet to ensure that external operating and maintaining station can identify the BS sending the BOOTP Request packet.

10. A method for automatically establishing base station operating and maintaining channel of claim 9, wherein the method further comprises: if the host functional module of the BSC/RNC allocates the IP address to the BS, the PVC information of the BS being added to the 'chaddr' in the BOOTP packet to ensure that the functional module of host can identify the BS sending the BOOTP Request packet.

11. A method for automatically establishing base station operating and maintaining channel of claim 10, where the method further comprises: the operating and maintaining station or the functional module allocating the IP address for the BS according to the corresponding relationship between the PVC channel and the IP address of the IP device at the opposite side of the IPOA channel.

12. A method for automatically establishing base station operating and maintaining channel of claim 11, wherein the method further comprises: the ATM APS being used to implement Automatic Protection Switch for the IPOA maintaining channel and ring networking.

* * * * *

UNITED STATES PATENT AND TRADEMARK OFFICE
CERTIFICATE OF CORRECTION

PATENT NO.        : 7,283,490 B2
APPLICATION NO.   : 10/391684
DATED             : October 16, 2007
INVENTOR(S)       : Jianhua Peng It is certified that error appears in the above-identified patent and that said Letters Patent is hereby corrected as shown below:

Title Page, Item 73, "Assignee", please change:

"Hauwei"      to    "Huawei"

"Shenzen"     to    "Shenzhen"

"Guandong"    to    "Guangdong"

Signed and Sealed this

Seventeenth Day of March, 2009

JOHN DOLL
*Acting Director of the United States Patent and Trademark Office*